May 20, 1969 — W. T. DONOFRIO — 3,444,837
UTILITY VEHICLE
Filed Sept. 18, 1967 — Sheet 1 of 3
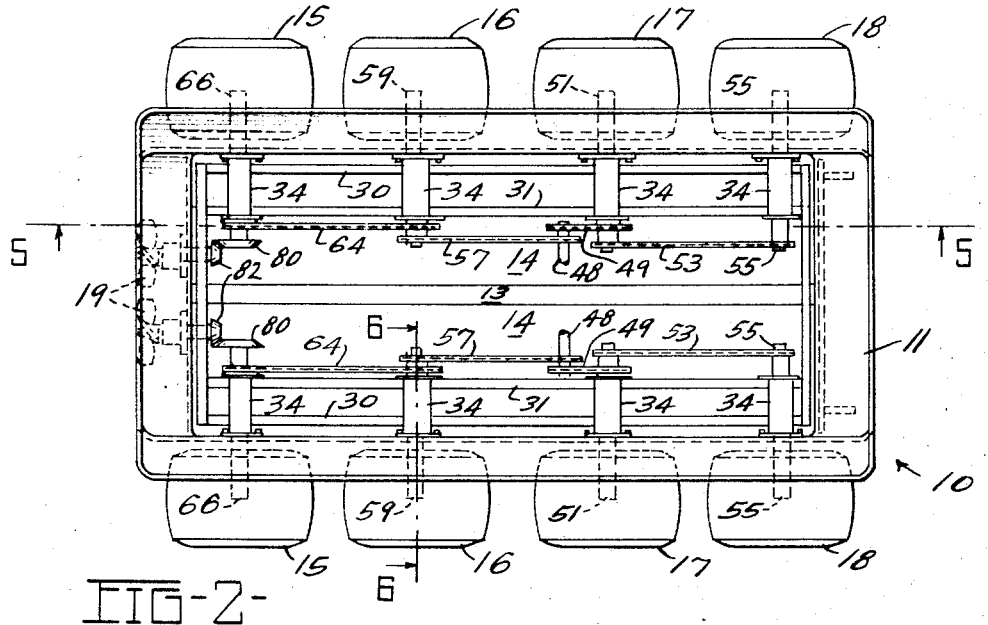
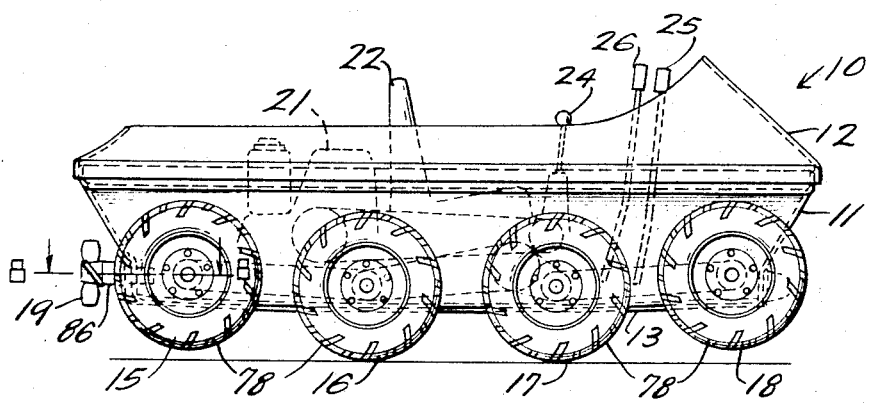
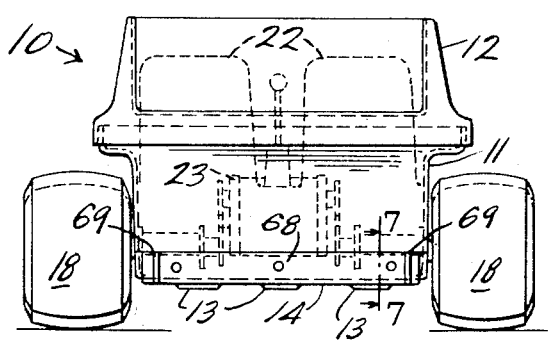
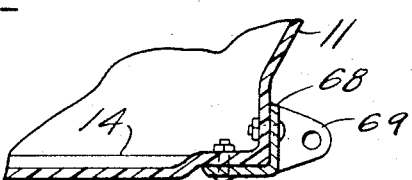
INVENTOR:
WILLIAM T. DONOFRIO.
BY
ATT'YS.

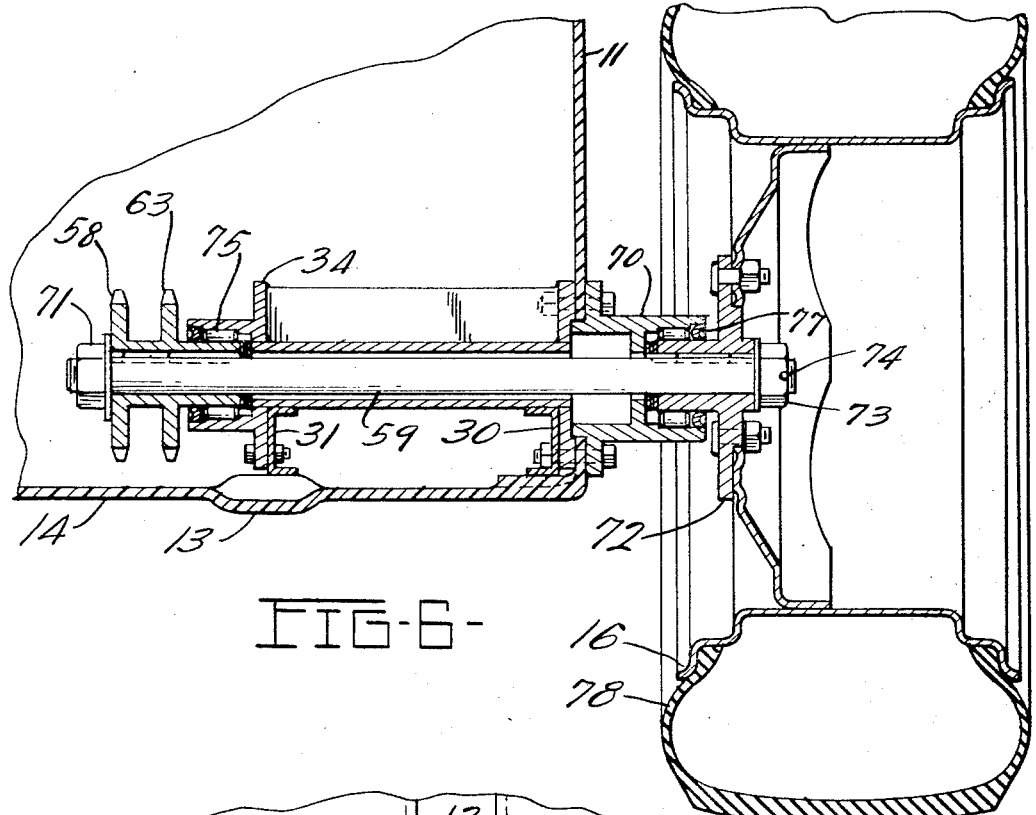
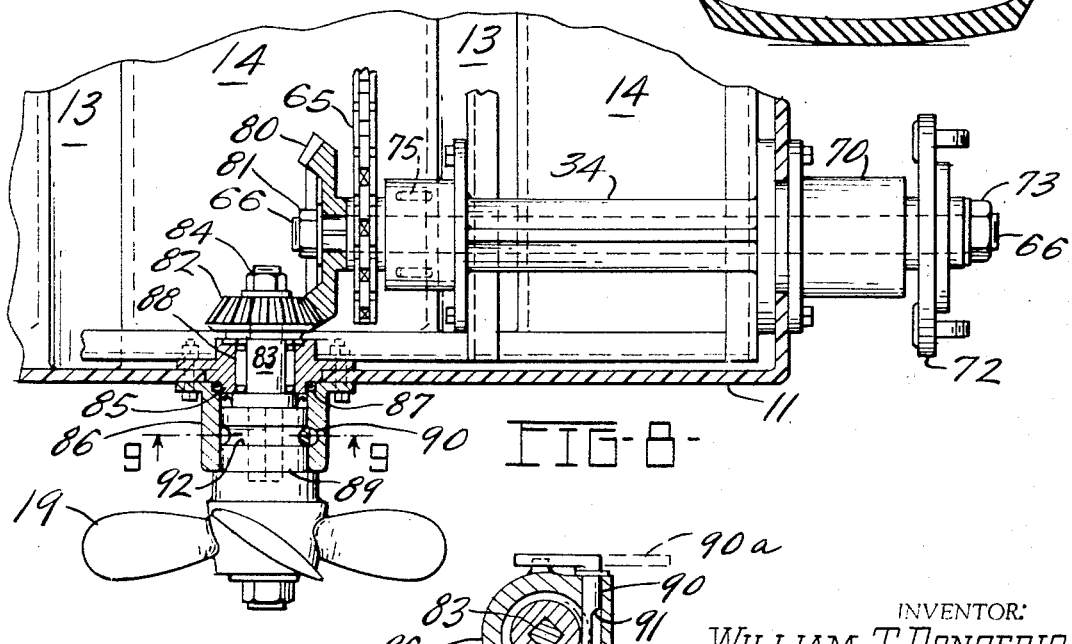
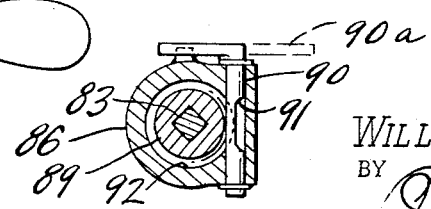

United States Patent Office 3,444,837
Patented May 20, 1969

3,444,837
UTILITY VEHICLE
William T. Donofrio, Toledo, Ohio, assignor to Donofrio & Company, Toledo, Ohio, a corporation of Ohio
Filed Sept. 18, 1967, Ser. No. 668,532
Int. Cl. B60f 3/00
U.S. Cl. 115—1                                3 Claims

ABSTRACT OF THE DISCLOSURE

An eight wheeled vehicle capable of traveling on dry land, in swamps and in deep water. The four wheels on each side of the vehicle are driven from a separate transmission. The inner two wheels on each side are vertically spaced at a level below the outer two wheels. Steering and braking is accomplished by locking either one or both of the transmissions.

Background of the invention

In prior art vehicles having rolling buoyant supports or wheels, the wheels were primarily used to provide support and stability to the vehicle. The driving force was often supplied by either an air or a water propeller.

Other prior art vehicles with buoyant, driven wheels are capable of traveling on land and through swamps. However, many of these vehicles are not designed for traveling in deep water. Steering is often accomplished by turning the front set of wheels. If the steering wheels are turned sharply while the vehicle is in swampy land, the vehicle tends to continue on in a straight path while the wheels dig into the swamp. Swamp land is seldom level and often contains deep holes filled with water.

In general, prior art vehicles designed for land and water travel or for land and swamp travel are not well suited for travel on a combination of dry land, swamps and deep water.

Summary of the invention

Briefly, the present invention contemplates an eight-wheeled utility vehicle or "swamp buggy" capable of operating on dry land, in swamps and in deep water. The eight wheels are attached in pairs on opposite sides of the vehicle. The front and rear pairs of wheels are slightly raised so that when traveling on flat land the vehicle rides on the two intermediate pairs of wheels. A laterally positioned shaft is driven by a centrally mounted motor. Planetary transmissions are mounted on the ends of the shaft. The wheels are operatively connected to the planetary transmissions. Steering is accomplished through controls connected to the planetary transmissions which selectively stop either the left or the right sets of wheels. Two detactable propellers are also driven from the transmissions.

Accordingly, it is an object of this invention to provide an improved utility vehicle which is capable of traveling in swamps as well as on dry land and in deep water.

Another object of the invention is to provide an improved drive train for a utility vehicle.

Another object of the invention is to provide an improved steering system for utility vehicles.

The foregoing and other objects, features and advantages of the invention will be apparent from the following more particular description of a preferred embodiment of the invention as illustrated in the accompanying drawings.

Brief description of the drawings

FIGURE 1 is a side elevational view of one embodiment of a utility vehicle conducted according to the present invention;

FIGURE 2 is a plan view of the vehicle shown in FIGURE 1, with parts deleted for clarity, and showing in particular the location of the wheels, axles, propellers, and drive chains;

FIGURE 3 is a front elevational view of the vehicle shown in FIGURE 1;

FIGURE 4 is a perspective view of the frame and drive train portion of the vehicle shown in FIGURE 1;

FIGURE 5 is a fragmentary cross-sectional view taken along the line 5—5 of FIGURE 2 and showing the drive mechanism for the four wheels located on one side of the vehicle;

FIGURE 6 is a fragmentary cross-sectional view taken along the line 6—6 of FIGURE 2, shown on an enlarged scale;

FIGURE 7 is an enlarged fragmentary cross-sectional view taken along the line 7—7 of FIGURE 3;

FIGURE 8 is an enlarged cross-sectional view, showing the propeller drive, taken along the line 8—8 of FIGURE 1; and FIGURE 9 is a cross-sectional view of the propeller locking mechanism taken along the line 9—9 of FIGURE 8.

Description of the preferred embodiment

Referring now to the drawings in more detail, and particularly to FIGURES 1, 2 and 3, a utility vehicle according to the present invention is indicated generally by the reference number 10. The vehicle 10 has a generally rectangular hull 11 and a top cover 12 which acts as a splash guard and wind screen. Although the hull 11 may be constructed from metal or wood, fibrous glass reinforced plastic is superior because of its light weight, strength and resilience. The hull 11 has three longitudinal reinforcing ribs 13 on its bottom surface 14. The vehicle 10 is supported and carried by four pairs of wheels 15, 16, 17 and 18. Two propeller units 19 are mounted in the rear of the vehicle 10.

Figures 4, 5:
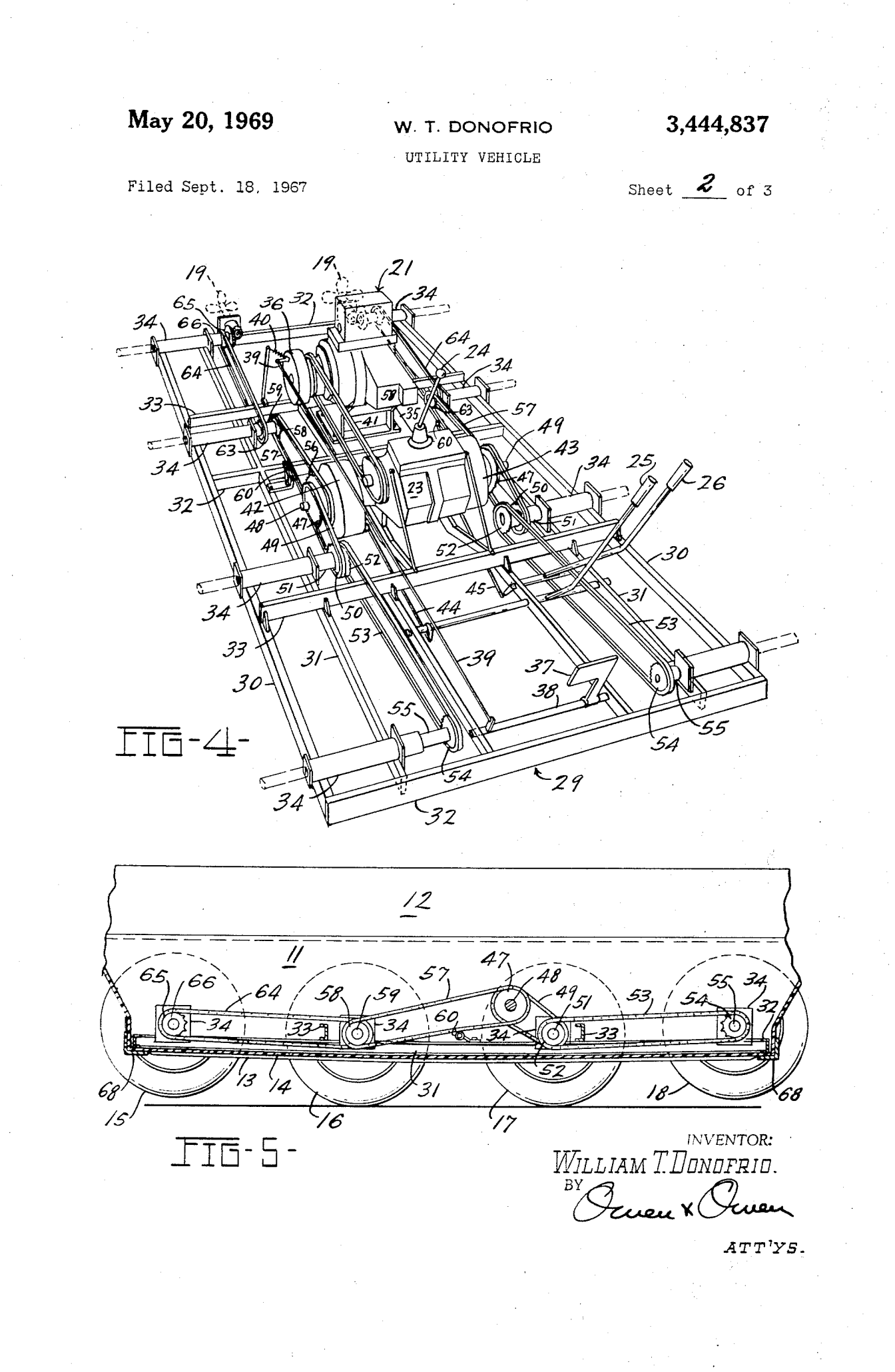

Power is supplied by a motor, for example, by an internal combustion engine 21 (see FIGURE 4). The engine 21 is mounted over the rear intermediate wheels 16. Two seats 22 are mounted in front of the engine 21 and over the front intermediate wheels 17. The seats 22 are placed such that the center of gravity of the loaded vehicle 10 is near the center of the vehicle. A gear box 23 having a shift lever 24 is mounted between the seats 22. Steering control levers 25 and 26 are mounted in the forward portion of the vehicle 10 in front of the driver.

FIGURE 4 shows the drive train of the vehicle 10 which is mounted on a metal frame 29. The frame 29 includes outboard supports 30, inboard supports 31 and cross frame members 32 and 33. When the vehicle 10 is used in extremely rough or hilly country, a roll bar (not shown) can be mounted on the frame 29. Eight tubular axle housings 34 are mounted between the outboard supports 30 and the inboard supports 31. The engine 21 is mounted on a platform 35 located between two cross frame members 32 and 33.

The output shaft of the engine 21 is connected to a clutch 36, which is operated by pedal 37 through clutch linkages 38 and 39. A clutch return spring 40 biases the clutch 36 into its drive position. The gear box 23 is operatively connected to the engine 21 and the clutch 36 by a drive belt 41. The gear box 23 provides several forward and reverse speed ranges. The different ranges are selected with gear shift lever 24. Such gear boxes are well known in the art.

The gear box 23 is operatively connected to an output shaft (not shown). The left and right ends of the lateral output shaft are operatively connected to opposed planetary transmissions 42 and 43.

The wheels and propeller on each side of the vehicle are driven from the output of the planetary transmission for that side. Each of the planetary transmissions 42 and 43 comprises an outer ring gear, a driven sun gear and a series of planet gears as is known in the art. When the ring gear is locked and the driven sun gear continues to rotate, the planet gears move around the ring gear but no longer drive the ring gear. Because the wheels are operatively connected to the planetary transmission ring gear, when the ring gear is locked the wheels on that side are also locked.

When the ring gear is released, the planet gears act as drive connections between the driven sun gear and the ring gear which is operatively connected to the wheels.

The control levers 25 and 26 are connected through linkages 44 and 45 to selectively lock the ring gears of the planetary transmissions 42 and 43, respectively. Obviously pedals can be used here instead of levers. When one of the planetary transmission ring gears is locked while the other ring gear is being driven, the vehicle will turn toward the side with the locked transmission if the vehicle is traveling in a forward direction. The turning action will occur whether the vehicle is on land, in swamps or in deep water.

Sprockets 47 are attached to output shafts 48 of the planetary transmissions 42 and 43. Chains 49 extend between each of the opposed sprockets 47 and drive sprockets 50, which are splined on the axles 51 which mount the front intermediate wheels 17. (See FIGURE 5).

Coaxial sprockets 52 are also splined to the axles 51. Chains 53 extend between the sprockets 52 and sprockets 54 which are splined on axles 55 and which mount the front wheels 18.

In a similar manner, coaxial sprockets 56 are splined to the output shafts 48 of the transmissions 42 and 43. Chains 57 extend between the sprockets 56 and drive sprockets 58 which are splined to axles 59 which mount the rear intermediate wheels 16. Chain tensioning mechanisms 60 are mounted on one of the cross frame members 32 (see FIGURES 4 and 5).

Coaxial sprockets 62 are splined on each of the axles 59. Chains 64 extend between the sprockets 63 and sprockets 65 which are splined on axles 66 and which mount the rear wheels 15.

FIGURE 5 is a cross section showing the relationship between the wheels, the several drive chains and the frame. The sprockets 47 and 56 are designed to drive the chains 49 and 57 at the same speed. Sprockets 52 and 63 drive chains 53 and 64 at the same speed. In this manner all four of wheels 15, 16, 17 and 18 located on one side of the vehicle 10 are driven at a uniform speed with respect to each other.

As FIGURE 5 shows, the front wheels 18 and the rear wheels 15 are mounted higher than the intermediate wheel 16 and 17. The vertical displacement of the wheels 18 and 15 is not critical. There are several advantages to raising the front and the rear pairs of wheels. In swamps and on land, the raised front wheels give greater traction and lift when necessary for traveling over obstacles. When the vehicle 10 is traveling on level land, it rides only on the intermediate pairs of wheels 16 and 17. This reduces the friction between the tires and the land resulting in reduced tire wear, greater speed and easier turning. During travel at relatively high speeds on level land or hard surfaces the need for a complex differential is eliminated.

Outboard and inboard supports 30 and 31 are slightly curved from front to rear (see FIGURE 5). Attachment of these supports to the flat bottom 14 prestresses the hull 11. The convex hull 11 resists twisting to a much greater degree than if it were flat.

Referring to FIGURES 3 and 7, a lateral stiffener 68 is attached to the lower front and rear edges of the hull 11. The stiffeners 68 protect the hull 11 against damage when the vehicle hits rocks or other obstacles. Brackets 69 are attached on opposed sides of the stiffeners 68 and are used for towing or to mount, for example, a scraper blade.

FIGURE 6 shows a cross section of one of the wheels 16, its axle 59 and the respective axle housing 34. The axle housing 34 is bolted to one of the outboard supports 30 and one of the inboard supports 31. The two supports 30 and 31 are attached to the hull 11. The bolts attaching axle housing 34 to the outboard support 30 extend through the hull 11 and anchor an outboard wheel bearing support 70. Preferably, an O-ring (not shown) seals the hull connection to prevent water from leaking into the hull 11.

The sprockets 58 and 63 which are splined onto the axle 59 are held in place by a nut and washer assembly 71. A wheel hub 72 is splined onto the other end of axle 59 and is held in place by a nut and washer assembly 73. A cotter pin 74 is used to lock nut 73 onto the axle 59. The axle 59 is supported by bearings 75 positioned between a sprocket hub 76 and one end of the axle housing 34 and between wheel hub 72 and the wheel bearing support 70. Oil seals 77 maintain the grease packing around the bearings 75 and prevent water from leaking into the hull 11. A buoyant tire 78 is mounted on the wheel 16, which is in turn bolted to hub 72. The buoyant tires 78 which are mounted on each of the wheels 15, 16, 17 and 18 are heavily grooved tires. The grooving increases traction in swamps and also act as rudders and paddles when in deep water.

A propeller drive system is shown in FIGURE 8. A bevel gear 80 is splined onto the axle 66 adjacent the sprocket 65. A nut 81 retains bevel gear 80 on axle 66. A second bevel gear 82 meshes with bevel gear 80. The bevel gear 82 is splined onto a propeller drive axle 83 and is held in place by nut 84. Bevel gears 80 and 82 are selected to give a transfer ratio greater than one-to-one so the propellers 19 will turn faster than the wheels. A propeller axle housing 85 is bolted to the hull 11 and to an outboard propeller support 86 which extends rearwardly from the hull 11. An O-ring seal 87 is used to prevent water from leaking into the hull 11. The propeller drive axle 83 is supported in the propeller axle housing 85 by bearings 88.

The outer end of the propeller drive axle 83 is squared (see FIGURE 9). A flange 89 attached to the propeller 19 fits over the squared end of axle 83 and into the outboard propeller support 86. The propeller is removably held in place by a locking lever 90. As is shown in FIGURE 9, the locking lever 90 has a notch 91. When the locking lever 90 is turned to the dotted line position 90a, as shown in FIGURE 9, the notch 73 permits the propeller 19 to be pulled out of engagement with the propeller axle 83. When locking lever 90 is moved to the solid line position, the locking lever 90 is received in a groove 92 defined by the propeller flange 89. When this occurs, the locking lever 90 mounts the propeller 19 to the outboard propeller support 86 in driving relation with the squared end of the propeller drive axle 83. This arrangement permits the propeller to be easily removed when traveling on land or in swamps.

Referring to FIGURES 3 and 6, the longitudinal ribs 13 on the bottom surface 14 of the hull 11 act as accordian pleats when the hull 11 is subjected to torsion forces. Torsion or twisting forces occur, for example, when one wheel passes over an obstacle. The remaining wheels are at a different vertical elevation and hull twisting results. It has been found that the ribs 13 which are preferably either U shaped or V shaped in cross section are very important. The legs of the ribs 13 move toward or away from each other like an accordian thereby providing hull flexibility. Without such ribs, cracking of the hull tends to occur when the hull is subjected to severe torsion forces.

While the invention has been particularly shown and described with reference to preferred embodiments thereof, it will be understood by those skilled in the art that the foregoing and other changes in form and details may be made therein without departing from the spirit and scope of the invention.

What I claim is:

1. A self-supporting powered chassis for a utility vehicle, said chassis comprising, in combination, a rigid structurally unitary frame, a motor mounted on said frame, first and second transmissions supported by said frame, a clutch mechanism, a speed change mechanism, said clutch and speed change mechanisms being connected in train between said motor and both of said transmissions, a first series of wheels mounted on the left side of said frame, first drive means operatively connected between said first transmission and said first series of wheels, a second series of wheels mounted on the right side of said frame, second drive means operatively connected between said second transmission and said second series of wheels, each of said first and second transmissions including a planetary drive having a sun gear driven from said motor and an outer ring gear for driving the respective drive means, and separate control means for selectively locking each of said first and second transmissions, said control means comprising a brake adapted to lock a respective one of the outer ring gears against rotation, whereby one or both of said first and second series of wheels can be stopped for stopping and steering said vehicle.

2. A chassis according to claim 1 in which the two series of wheels are arranged in opposed pairs, and which has two series of corresponding stub axles for said wheels, axle housings rigidly mounted on said frame, and sprockets on the inner ends of said axles and in which the first and second drive means comprise series of drive chains engaged with said sprockets and with the output side of the respective one of said first and second transmissions.

3. A chassis according to claim 1 including rearwardly extending stub shafts driven from the rearmost ones of said wheel axles and propellers removably attached to the rear ends of said stub shafts.

References Cited

UNITED STATES PATENTS

| | | | |
|---|---|---|---|
| 2,341,165 | 2/1944 | Todd | 115—1 |
| 2,821,949 | 2/1958 | Uyehara | 115—1 |
| 3,176,055 | 3/1965 | Loos | 9—6 X |
| 3,204,713 | 9/1965 | Shanahan et al. | 115—1 |
| 3,372,766 | 3/1968 | Lifferth | 115—1 X |

ANDREW H. FARRELL, *Primary Examiner.*

U.S. Cl. X.R.

118—8, 9, 314, 324